United States Patent Office 3,294,842
Patented Dec. 27, 1966

3,294,842
α-HYDROXY OXIMES CONTAINING
ALKENYL RADICALS
Ronald R. Swanson, New Hope, Minn., assignor to
General Mills, Inc., a corporation of Delaware
No Drawing. Filed July 2, 1965, Ser. No. 469,335
3 Claims. (Cl. 260—566)

This application is a continuation-in-part of my prior application Serial No. 260,868, filed February 25, 1963, and now abandoned.

The present invention relates to new α-hydroxy oximes. More particularly, it relates to new α-hydroxy oximes having the structural formula:

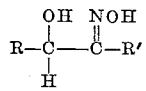

where R and R' are unsaturated aliphatic hydrocarbon radicals containing from about 6 to 20 carbon atoms. The α-hydroxy oximes of this invention also contain a total of from 14 to 40 carbon atoms. Representative mono- and polyunsaturated aliphatic radicals are heptenyl, decenyl, octadecenyl, octadecynyl, and alkyl substituted radicals such as ethylhexenyl and ethyloctadecenyl. Preferably R and R' are the same and are alkenyl radicals.

My new compounds are prepared by reacting an acyloin with a hydroxylamine salt under reflux conditions. Such reaction can be carried out by refluxing the reactants in an alcohol such as ethanol and adding pyridine to combine with the acid associated with the hydroxylamine. It is also preferred to use an excess of the hydroxylamine salt which salt may be the hydrochloride, acid sulfate or the like.

The following examples serve to illustrate the present invention without, however, limiting the same thereto.

Example I

Into a 1 liter reaction flask equipped with a reflux condenser were charged 49.3 g. (0.0925 mole) 19-hydroxy-hexatriaconta-9,27-dien-18-one (i.e. the acyloin derived from oleic acid), 25.0 g. (0.36 mole) hydroxylamine hydrochloride, 125 ml. pyridine and 125 ml. absolute ethanol. The reaction mixture was heated to reflux and then refluxed for 1¾ hours. The crude reaction mixture, after cooling overnight, was added to 1 liter of water along with 500 ml. ether. The aqueous layer was discarded and then the ether layer was washed 4 times with water, 2 times with 3% HCl solution and 4 more times with water. The ether layer was dried and stripped of ether under vacuum. There was obtained 42.0 g. of 19-hydroxyhexatriaconta-9,27-dien-18-oxime.

The new compounds of the present invention are useful as extractants for recovering copper values from aqueous solutions. Thus about 2 to about 50% by weight of the α-hydroxy oximes can be dissolved in a liquid hydrocarbon which is then contacted with an aqueous solution containing copper values. The copper values are extracted into the water immiscible organic phase. Copper metal can be recovered directly by hydrogenating the organic phase. Copper metal can also be recovered by contacting the separated copper-pregnant organic phase with an aqueous stripping medium which preferably contains a mineral acid such as sulfuric acid. The copper values are thus stripped from the organic phase and copper metal can be recovered from the copper-pregnant aqueous stripping medium by direct electrolysis. Copper salts can also be recovered from the stripping medium by crystallization and/or evaporation. This extraction process utilizing the new compounds of the present invention makes it feasible to recover copper from dilute aqueous solutions. And, of course, copper metal is very valuable. This utility is further illustrated by the following example.

Example II

A ten milliliter portion of an aqueous feed solution containing copper values (0.1 M $CuSO_4$ and 0.4 M sodium acetate) was extracted with a 20 milliliter portion of a solution of 27.4 g. of the α-hydroxy oxime of Example I in 500 milliliters of kerosene. The extraction was performed on a single stage batch basis at ambient room temperature. The α-hydroxy oxime-kerosene solution was first added to a separatory funnel followed by addition of the aqueous feed solution. The funnel was shaken to equilibrate the mixtures and then the phases were allowed to separate. The aqueous phase was analyzed for residual copper. Such analysis showed 0.0176 M $Cu^{++}$ indicating that 82% of the copper values were extracted by the α-hydroxy oxime of Example I.

It is to be understood that the invention is not to be limited to the exact details of operation or the exact compositions shown and described, as obvious modifications and equivalents will be apparent to those skilled in the art and the invention is to be limited only by the scope of the appended claims.

Now, therefore, I claim:

1. α-Hydroxy oximes having the formula

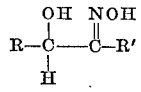

where R and R' are alkenyl radicals containing 6 to 20 carbon atoms, said oximes being further characterized as having a total carbon atom content of 14 to about 40.

2. α-Hydroxy oximes as defined in claim 1 wherein R and R' are the same.

3. 19-hydroxyhexatriaconta-9,27-dien-18-oxime.

No references cited.

CHARLES B. PARKER, *Primary Examiner.*
ROBERT V. HINES, *Assistant Examiner.*